United States Patent [19]

Nishi et al.

[11] Patent Number: 5,972,425
[45] Date of Patent: Oct. 26, 1999

[54] METHOD OF COATING USING PIGMENT-CONTAINING WATER-BASED PAINT COMPOSITION

[75] Inventors: Tadahiko Nishi; Takeshi Takagi, both of Yawata; Yoshitaka Okude, Hirakata, all of Japan

[73] Assignee: Nippon Paint Co., Ltd., Osaka, Japan

[21] Appl. No.: 09/008,247

[22] Filed: Jan. 16, 1998

Related U.S. Application Data

[62] Division of application No. 08/777,510, Dec. 30, 1996, Pat. No. 5,747,558.

[30] Foreign Application Priority Data

Dec. 28, 1995 [JP] Japan .................................. 7-353212
Dec. 28, 1995 [JP] Japan .................................. 7-353213

[51] Int. Cl.$^6$ ..................................................... B05D 3/02
[52] U.S. Cl. ..................... 427/195; 427/203; 427/379; 427/388.4; 427/409; 428/461
[58] Field of Search .............................. 427/189, 195, 427/203, 379, 388.4, 409; 428/461

[56] References Cited

U.S. PATENT DOCUMENTS

| | | | |
|---|---|---|---|
| 4,069,274 | 1/1978 | Shibata et al. | 525/170 |
| 4,459,379 | 7/1984 | Schwarz | 525/170 |
| 5,280,089 | 1/1994 | DeGraat et al. | 525/445 |

FOREIGN PATENT DOCUMENTS

| | | |
|---|---|---|
| 231666 | 8/1987 | European Pat. Off. . |
| 555903 | 8/1993 | European Pat. Off. . |
| 56-151717 | 11/1981 | Japan . |
| 58-149962 | 9/1983 | Japan . |

*Primary Examiner*—Erma Cameron
*Attorney, Agent, or Firm*—Pollock, Vande Sande & Amernick

[57] ABSTRACT

A heat-curable, water-dispersible resin composition comprising 50 to 90% by weight of a film-forming polymer (A) obtained by copolymerizing an ethylenic monomer having a saturated $C_6$ to $C_{18}$ hydrocarbon group, a hydroxy-containing ethylenic monomer, an acidic group-containing ethylenic monomer and another ethylenic monomer, and 50 to 10% by weight of a hydroxy-terminated polyester resin (B), said resin (B) being grafted on said polymer (A) by transesterification, and at least part of the acidic groups in said polymer (A) being neutralized with a base (C); a method of producing said resin composition; a water-based paint composition comprising said resin composition and a curing agent; and a two-coat one-bake coating method which uses said paint composition as a base coat. This invention provides a water-based paint composition which shows good workability in a broad humidity condition range, and excellent in storage stability, paint film appearance and performance characteristics.

10 Claims, No Drawings

5,972,425

1

METHOD OF COATING USING PIGMENT-CONTAINING WATER-BASED PAINT COMPOSITION

This is a division of application Ser. No. 08/777,510, filed Dec. 30, 1996, now U.S. Pat. No. 5,747,558.

FIELD OF THE INVENTION

The present invention relates to a heat-curable, water-dispersible resin composition which shows good workability in a broad humidity condition range from high humidity to low humidity and can provide a water-based paint composition excellent in storage stability, paint film appearance and paint film performance characteristics, a method of producing such resin composition, a water-based paint composition, a method of coating, and a coated article.

PRIOR ART

In automobile coating, the so-called two-coat one-bake technique is employed which comprises applying a metallic base paint composition, called top coat, which contains a metallic pigment, to the steel substrate or other material provided in advance with an undercoat and an intermediate coat, then, without curing of the resulting paint film, further applying a clear paint composition in the wet-on-wet manner and curing the metallic base paint and clear paint simultaneously.

The prior art paints that are used in said two-coat one-bake technique are mostly organic solvent-based ones. However, from the viewpoints of safety during coating, reduction of environmental pollution and resources saving, among others, switching over to water-based paints has been earnestly desired in recent years. For this purpose, various water-based paints for automobile coating have been developed.

Thus, for instance, Japanese Kokai Publication Hei-04-25582 discloses a water-based metallic base paint composition comprising, as main components thereof, an aqueous dispersion of an amido group-containing acidic resin and a hydrophilic group-carrying polyurethane resin. However, under high humidity conditions, namely when the humidity in the coating step is 80% or higher, this composition causes sagging on the vertical surface and, when the humidity in the coating step is below 65%, said composition provides paint films unsatisfactory in surface smoothness.

In Japanese Kokai Publication Hei-05-198329, a water-based paint composition is proposed which comprises, as main components thereof, an amido group-containing acrylic resin and a polycarbonate resin. However, in a high humidity environment, namely when the humidity in the coating step is about 85 to 90%, this composition encounters a workability problem, allowing sagging on the vertical surface. Furthermore, since the hydrophobic polycarbonate resin and the hydrophilic acrylic resin are poorly compatible with each other, the storage stability is poor and the paint films obtained are unsatisfactory in appearance, mechanical characteristics, water resistance, chemical resistance and other physical and chemical properties.

On the other hand, Japanese Kokai Publication Hei-04-233926 discloses a hybrid polymer excellent in paint film performance characteristics which comprises a core component comprising of a conjugated double bond-containing epoxy resin and a shell component derived by grafting thereon an addition polymer of a free radical-polymerizable monomer. However, when this hybrid polymer is dispersed in water, the interparticle interaction is weak, hence the

2 viscosity development is insufficient. Therefore, it has a sagging problem.

Further, in Japanese Kokai Publication Hei-07-74320, a water-based paint composition is proposed in which a water-dispersible resin composition comprising an acrylic resin as a core component and a polyester resin as a shell component is used and which has good workability within a broad humidity condition range from high humidity to low humidity. However, said composition is poor in storage stability since the shell-forming polyester resin is susceptible to hydrolysis.

In view of the above-mentioned state of the art, it is an object of the present invention to provide a heat-curable, water-dispersible resin composition with which good workability can be secured within a broad humidity condition range from high humidity to low humidity and which can provide a water-based paint composition excellent in stability, paint film appearance and paint film physical properties, a method of producing such resin composition, such water-based paint composition, a method of coating, and a coated article.

SUMMARY OF THE INVENTION

The present inventors made intensive investigations in an attempt to solve the problems mentioned above and, as a result, found that the above object can be attained by providing a water-dispersible resin composition derived from two main constituents, namely an acrylic resin comprising a specific proportion of an ethylenic monomer having a saturated hydrocarbon group with 6 or more carbon atoms and a polyester resin by grafting part of said polyester resin onto the acrylic resin by transesterification. Based on this finding, the present invention has now been completed.

Thus, the gist of the present invention consists in:

[1] A heat-curable, water-dispersible resin composition which comprises
50 to 90% by weight of a film-forming polymer (A) obtained by copolymerizing an ethylenic monomer having a saturated hydrocarbon group having 6 to 18 carbon atoms, a hydroxy-containing ethylenic monomer, an acidic group-containing ethylenic monomer and another ethylenic monomer, and 50 to 10% by weight of a hydroxy-terminated polyester resin (B),
the sum total of said (A) and (B) being 100% by weight, said film-forming polymer (A) and said polyester resin (B) being grafted on each other by transesterification, and at least part of the acidic groups in said film-forming polymer (A) being neutralized with a base (C);

[2] A water-based paint composition which comprises the above-mentioned heat-curable, water-dispersible resin composition and a curing agent;

[3] A water-based paint composition which comprises the above-mentioned heat-curable, water-dispersible resin composition and a curing agent, as supplemented with a polymer thickgening agent (this composition is hereinafter referred to as "water-based paint composition (II)");

[4] A pigment-containing water-based paint composition which comprises the water-based paint composition mentioned above under [2] or said water-based paint composition (II) as supplemented with a pigment.

[5] A method of producing the heat-curable, water-dispersible resin composition mentioned above which comprises subjecting 50 to 90% by weight of a film-forming polymer (A) obtained by copolymerizing an ethylenic monomer having a saturated hydrocarbon group having 6 to 18 carbon atoms, a hydroxy-containing ethylenic monomer, an acidic group-containing ethylenic monomer and another ethylenic monomer, and 50 to 10% by weight of a hydroxy-terminated polyester resin (B), the sum total of said (A) and (B) being 100% by weight, to transesterification reaction at 130 to 200° C. and thereafter neutralizing at least part of the acidic groups contained in said film-forming polymer (A) with a base (C);

[6] A two-coat one-bake coating method which uses the pigment-containing water-based paint composition mentioned above as a base coat;

[7] An article coated with the water-based paint composition, water-based paint composition (II) or pigment-containing water-based paint composition mentioned above; and

[8] An article coated by the above-mentioned coating method.

The heat-curable, water-dispersible resin composition of the present invention comprises the film-forming polymer (A) and the polyester resin (B).

Said film-forming polymer (A) is a product of copolymerization of an ethylenic monomer having a saturated hydrocarbon group having 6 to 18 carbon atoms, a hydroxy-containing ethylenic monomer, an acidic group-containing ethylenic monomer and another ethylenic monomer.

The above-mentioned ethylenic monomer having a saturated hydrocarbon group having 6 to 18 carbon atoms is not limited to any particular species but includes, among others, esters of acrylic acid, methacrylic acid and like acids, whose ester moiety contains 6 to 18 carbon atoms. As typical examples of these, there may be mentioned hexyl acrylate, hexyl methacrylate, cyclohexyl acrylate, cyclohexyl methacrylate, ethylhexyl acrylate, ethylhexyl methacrylate, lauryl acrylate, lauryl methacrylate, lauryl-stearyl acrylate, stearyl acrylate and the like. It may be a product obtained by reacting a functional group-containing ethylenic monomer with a compound having a saturated hydrocarbon group having 6 to 18 carbon atoms and capable of reacting with said functional group. As examples of such, there may be mentioned products obtained by reaction of glycidyl methacrylate with lauric acid or stearic acid, products obtained by reaction of methacryl isocyanate with lauryl alcohol or stearyl alcohol, and the like.

Said ethylenic monomer having a saturated hydrocarbon group having 6 to 18 carbon atoms, which is to be used in the practice of the present invention, is proper in bulkiness and therefore can give a heat-curable, water-dispersible resin composition capable of increasing the structural viscosity of the paint composition in which said resin composition is used, thus rendering the characteristics of said paint composition proper and appropriate.

The above-mentioned hydroxy-containing ethylenic monomer is not limited to any particular species but includes, among others, 2-hydroxyethyl acrylate, 4-hydroxybutyl acrylate, 4-hydroxybutyl methacrylate, 2-hydroxypropyl acrylate, 2-hydroxyethyl methacrylate, 2-hydroxypropyl methacrylate, 2,4-dihydroxy-4'-vinylbenzophenone, N-(2-hydroxyethyl)acrylamide, N-(2-hydroxyethyl)methacrylamide, and the like.

The above-mentioned acidic group-containing ethylenic monomer is not limited to any particular species but includes, among others, carboxy-containing monomers. As specific examples, there may be mentioned acrylic acid, methacrylic acid, crotonic acid, isocrotonic acid; styrene derivatives such as 3-vinylsalicylic acid and 3-vinylacetylsalicylic acid, and the like.

Said acidic group-containing ethylenic monomer also includes half esters, half amides and half thioesters of dibasic acid monomers. As examples, there may be mentioned half esters, half amides and half thioesters of maleic acid, fumaric acid, itaconic acid, etc. In this case, the alcohols for forming such half esters are, for example, alcohols having 1 to 12 carbon atoms such as methanol, ethanol, propanol, butanol, methylcellosolve, ethylcellosolve, dimethylaminoethanol, diethylaminoethanol, acetol, allyl alcohol, propargyl alcohol, etc. Preferred among these are butanol, dimethylaminoethanol, diethylaminoethanol, acetol, allyl alcohol and propargyl alcohol.

The mercaptans for forming the above-mentioned half thioesters include, among others, mercaptans having 1 to 12 carbon atoms such as ethyl mercaptan, propyl mercaptan, butyl mercaptan, etc.

The amines for forming the above-mentioned half amides are, for example, amines having 1 to 12 carbon atoms such as ethylamine, diethylamine, butylamine, cyclohexylamine, aniline, naphthylamine, etc.

Among the half esters, half amides and half thioesters of dibasic acid monomers mentioned above, the half thioesters rather have an odor problem. The half esters and half amides have no such problem and can suitably be used.

The half esterification, half thioesterification and half amidation reactions for the production of said half esters, half amides and half thioesters of dibasic acid monomers can be carried out in the conventional manner, for example within a temperature range from room temperature to 120° C., using, when necessary, a tertiary amine as a catalyst.

The above-mentioned another ethylenic monomer is not limited to any particular species but includes those ethylenic monomers which are other than the above-mentioned ethylenic monomer having a saturated hydrocarbon group having 6 to 18 carbon atoms, hydroxy-containing ethylenic monomers and acidic group-containing ethylenic monomers and which have no reactive functional groups. As such, there may be mentioned, for example, styrenes such as styrene and methylstyrene; acrylate esters such as methyl acrylate, ethyl acrylate, butyl acrylate and 2-ethylhexyl acrylate; methacrylate esters such as methyl methacrylate, ethyl methacrylate, butyl methacrylate, isobutyl methacrylate, p-butyl methacrylate and 2-ethylhexyl methacrylate; nitriles such as acrylonitrile; olefins such as ethylene and propylene; and the like. Furthermore, mention may also be made of amide group-containing ethylenic monomers such as acrylamide, N,N-dimethylacrylamide, N,N-dimethylmethacrylamide and N,N-dibutylacrylamide.

In the present invention, the above-mentioned ethylenic monomer having a saturated hydrocarbon group having 6 to 18 carbon atoms, hydroxy-containing ethylenic monomer and acidic group-containing ethylenic monomer are, in principle, species distinct from one another. Nevertheless, a hydroxy- and acidic group-containing monomer may also be used unless it is incompatible with the constitution of the present invention.

The content of the ethylenic monomer having a saturated hydrocarbon group having 6 to 18 carbon atoms in the above-mentioned film-forming polymer (A) is preferably 30 to 80% by weight. When said content is below 30% by weight, the interaction between particles is weak, so that sagging tends to readily occur. When it exceeds 80% by weight, the contents of the acidic group-containing ethylenic monomer and hydroxy-containing ethylenic monomer become insufficient, leading to a decrease in curability and/or aqueous dispersion stability. A more preferred range is 40 to 60% by weight.

Said film-forming polymer (A) preferably has a hydroxyl value of 50 to 200 mgKOH/g. A hydroxyl value less than 50 mgKOH/g leads to poor paint film curability while a hydroxyl value exceeding 200 mgKOH/g results in a decrease in paint film water resistance. A more preferred range is 60 to 150 mgKOH/g. The above-mentioned hydroxyl value can be attained by using the hydroxy-containing ethylenic monomer in a proportion of 2 to 40% by weight.

Said film-forming polymer (A) preferably has an acid value of 10 to 100 mgKOH/g. An acid value less than 10 mgKOH/g leads to poor dispersibility in water, while an acid value exceeding 100 mgKOH/g results in a decrease in paint film water resistance. A more preferred range is 20 to 60 mgKOH/g. The above-mentioned acid value can be attained by using the acidic group-containing ethylenic monomer in a proportion of 2 to 60% by weight, preferably 4 to 40% by weight.

Said film-forming polymer (A) preferably has a number average molecular weight of 5,000 to 100,000. When the number average molecular weight is below 5,000, the paint film will have a decreased hardness and poor water resistance. When it exceeds 100,000, the atomizability in the step of spray coating becomes worse and the paint film smoothness decreases. A more preferred range is 10,000 to 60,000.

Said film-forming polymer (A) is produced by copolymerizing the monomer components mentioned above. In this case, the copolymerization can be effected by a per se known method, for example by adding an initiator and a mixture of said monomers dropwise to a heated solvent with heating and stirring to give a copolymer. In this case, a preferred embodiment is, for example, such that the polymerization initiator and the monomer mixture are simultaneously added dropwise for 1 to 5 hours, preferably for 2 to 3 hours, to a solution containing the polyester resin (B) to be detailedly mentioned later herein and then the polymerization temperature is maintained for 0 to 4 hours, preferably 1 to 2 hours.

At least part of the acidic groups in the above-mentioned film-forming polymer (A) is neutralized with base (C). Said base (C) is not limited to any particular species but includes, for example, ammonia, methylamine, ethylamine, dimethylamine, diethylamine, trimethylamine, triethylamine, dimethylethanolamine, diethanolamine, triethanolamine and the like. Among them, diethanolamine, dimethylethanolamine and triethanolamine are preferred.

In this case, the proportion of acidic groups to be neutralized is not particularly limited but is only required to be such that the extent of neutralization with said base (C) is sufficient to render the heat-curable, water-dispersible resin composition of the present invention dispersible in water. Thus, for instance, an appropriate proportion such as about 50% may be employed, and appropriate neutralization can be attained by using, for example, 0.4 to 2.0 moles, preferably 0.6 to 1.4 moles, of the amine per mole of the acidic groups contained, to thereby achieve the so-called post-emulsification.

The above-mentioned polyester resin (B) have terminal hydroxy groups. Said polyester resin (B) can be produced by polyesterification of a polyol and a polycarboxylic acid or a polycarboxylic acid anhydride. Said polyol is not limited to any particular species but includes, among others, tetraols such as pentaerythritol, trimethylolpropane dimer, etc.; triols such as trimethylolpropane, hexanetriol, etc.; and diols such as 1,9-nonanediol, 2-methyl-1,8-octanediol, neopentyl glycol, hydroxypivaloyl neopentyl glycol, 3-methyl-1,5-pentanediol, 1,5-pentanediol, 1,6-hexanediol, 1,4-butanediol, 2-methyl-1,3-propylene glycol, propylene glycol, hexylene glycol, ethylene glycol, diethylene glycol, hydrogenated bisphenol A, caprolactone diol, bishydroxyethyltaurine, reduced product of dimeric acid, etc.

In particular, when conjugated alkadiene diol having degree of polymerization (D.P.) of 5 to 50 alone, hydrogenated product thereof alone, or these mixture is used as above-mentioned polyol, characteristic properties of the present invention appear remarkably. Said diols are derived from conjugated alkadiene oligomer having D.P. of 5 to 50, or polymer. The molecular weight thereof is preferably 1000 to 4000, and in particular, 1500 to 3000 is more preferable. For example, 1,4-polyisoprene diol, 1,4- and 1,2-polybutadiene diol, and hydrogenated product thereof are preferable. These chemicals can be obtained from commercial products, and include Epol (trade name; hydrogenated polyisoprene diol, molecular weight=1860, D.P. average= 26, manufactured by Idemitsu Sekiyu Chemicals), PIP (trade name; polyisoprene diol, molecular weight=2200, D.P. average=34, manufactured by Idemitsu Sekiyu Chemicals), Polytel HA (trade name; hydrogenated polybutadiene diol, molecular weight=2200, D.P. average=39, manufactured by Mitsubishi Kasei Industries), Polytel H (trade name; hydrogenated polybutadiene diol, molecular weight=2350, D.P. average=42, manufactured by Mitsubishi Kasei Industries), R-45HT (trade name; polybutadiene diol, molecular weight=2270, D.P. average=42, manufactured by Idemitsu Sekiyu Chemicals), and the like. Using said diol as part of polyol component causes polyester resin more hydrophobic, thus a core in core-shell structure being formed easily, with difficult hydrolysis of polyester resin. Furthermore, the water release, or drainage, as well as workability is improved.

Said polycarboxylic acid is not limited to any particular species but includes, among others, isophthalic acid, terephthalic acid, tetrahydrophthalic acid, adipic acid, trimellitic acid, azelaic acid, sebacic acid, succinic acid, cyclohexanedicarboxylic acid, maleic acid, dimeric acid and the like.

The acid anhydride mentioned above is not limited to any particular species but includes, among others, the acid anhydrides derived from the above-mentioned polycarboxylic acids.

Said polyester resin (B) preferably has a number average molecular weight of 500 to 10,000. A number average molecular weight below 500 leads to a decrease in paint film hardness and water resistance, whereas when it exceeds 10,000, the paint film smoothness becomes decreased. A more preferred range is 800 to 8,000 and a still more preferred range is 1,000 to 6,000.

Said polyester resin (B) preferably has an acid value less than 15 mgKOH/g. An acid value above 15 mgKOH/g leads to a decrease in paint film water resistance. The acid value of resin (B) is more preferably less than 10 mgKOH/g and still more preferably less than 8 mgKOH/g.

Said polyester resin (B) can provide the paint film with pliability and flexibility. Since it is a hydrophobic resin, it can contribute to an improvement in workability, in particular from the viewpoint of poping.

For providing further flexibility, a monoepoxy compound can be added to said polyester resin (B). As said monoepoxy compound, there may be mentioned, among others, Cardura E10 (Shell), YOA10, YOA20 and YOA30 (aliphatic monoepoxy compound; Daicel Chemical Industries).

The heat-curable, water-dispersible resin composition of the present invention contains the above-mentioned film-forming polymer (A) and the above-mentioned polyester resin (B) in proportions of 50 to 90% by weight and 50 to 10% by weight, respectively, relative to the sum resin solid total of said film-forming polymer (A) and said polyester resin (B). When said film-forming polymer (A) accounts for less than 50% by weight and said polyester (B) for more than 50% by weight, the proportion of the hydrophilic moiety responsible for the water dispersibility of the heat-curable, water-dispersible resin composition is insufficient, hence the water dispersibility is low. When said film-forming polymer (A) accounts for more than 90% by weight and said polyester resin (B) for less than 10%, the characteristics of said polyester resin cannot be utilized efficiently but reduced workability and water dispersibility result. The above range is thus critical. Preferably, said film-forming polymer (A) accounts for 60 to 80% by weight and said polyester resin (B) for 40 to 20% by weight.

In the present invention, the above-mentioned polyester resin (B) is more hydrophobic than the above-mentioned film-forming polymer (A). Thus, the water tolerance and hexane tolerance of said film-forming polymer (A) are, for example, such that when 0.5 g of said polymer (A) is dissolved in 10 mL of tetrahydrofuran and 0.1 N aqueous potassium hydroxide is added dropwise to the solution until the solution becomes cloudy, 0.1 N aqueous potassium hydroxide required to be dropped amounts to 2.3 to 9.26 mL and, in the case of hexane, 20.60 to 45.30 mL is required. In the case of said polyester resin (B), 0.22 to 1.89 mL of 0.1 N aqueous potassium hydroxide is required to be dropped and, for hexane, an amount within the range of 25.20 to 45.90 mL is required. Therefore, when the heat-curable, water-dispersible resin composition of the present invention is dispersed in an aqueous medium, it is supposed that dispersed particles of the core/shell type are formed with the more hydrophilic film-forming polymer (A) occupying the surface layer to form the shell and the more hydrophobic polyester resin (B) taking its position internally to form the core. The viscosity produced by these particles can contribute to improved workability.

In the heat-curable, water-dispersible resin composition of the present invention, the above-mentioned polyester resin (B) is at least partially grafted onto the above-mentioned film-forming polymer (A) as a result of transesterification reaction and the acidic groups in said film-forming polymer (A) are at least partly neutralized. Therefore, it is supposed that, in an aqueous medium, the heat-curable, water-dispersible resin composition of the present invention can form particles having a structure such that said hydrophobic polyester resin (B) is positioned internally to form the so-called core and said hydrophilic film-forming polymer (A) is positioned externally to form the so-called shell and such that said core and said shell are so firmly bonded together that they cannot be readily separated from each other. Owing to the above structure, the heat-curable, water-dispersible resin composition of the present invention can avoid direct contacting of the polyester resin with water, so that the possibility of hydrolysis and the like of the polyester resin can be avoided.

Said resin composition can form a particle with the particle size of 10 to 1000 nm, and the particle is stable. Preferably, a particle with the particle size of 80 to 250 nm is more stable.

The heat-curable, water-dispersible resin composition of the present invention has the above-mentioned characteristic features, hence is quite distinct in structure, composition and other features from the resin compositions disclosed in Japanese Kokai Publication Hei-04-233926 and elsewhere, and can produce special effects which are never suggested by the cited inventions.

The heat-curable, water-dispersible resin composition of the present invention can suitably be produced according to a second aspect [II] of the present invention to be detailedly described in the following.

According to aspect [II] of the present invention, said heat-curable, water-dispersible resin composition is produced by subjecting 50 to 90% by weight of a film-forming polymer (A) obtained by copolymerizing an ethylenic monomer having a saturated hydrocarbon group having 6 to 18 carbon atoms, a hydroxy-containing ethylenic monomer, an acidic group-containing ethylenic monomer and another ethylenic monomer, and 50 to 10% by weight of a hydroxy-terminated polyester resin (B), the sum total of said (A) and (B) being 100% by weight, to transesterification reaction at 130 to 200° C. and thereafter neutralizing at least part of the acidic groups contained in said film-forming polymer (A) with a base (C).

In this case, the reaction between said film-forming polymer (A) and said polyester resin (B) can be effected, for example by admixing a required amount of said polyester resin (B) with said film-forming polymer (A) preliminarily produced by polymerization in an organic solvent or by producing said film-forming polymer (A) by polymerization in an organic solvent containing a required amount of said polyester (B) charged beforehand.

Said organic solvent is not limited to any particular species but includes, among others, aromatic hydrocarbons such as Solvesso 150 (S-150; Shoei Chemical Industries), xylene, etc.; esters such as butyl acetate etc.; lactones such as γ-butyrolactone etc.; ethers such as dibutyl ether, ethylene glycol diethyl ether, etc.; ketones such as methyl isobutyl ketone etc.; ether esters such as propylene glycol monomethyl ether acetate etc.; and amides such as N-methylpyrrolidone etc. These may be used in combination as a mixture of two or more.

According to aspect [II] of the present invention, the above-mentioned transesterification reaction is carried out by heating the above-mentioned film-forming polymer (A) and the above-mentioned polyester resin (B). In accordance with the present invention, at least part of said polyester resin (B) can thus be grafted onto said film-forming polymer (A) by heating said film-forming polymer (A) and said polyester resin (B) to thereby react the hydroxy groups in said film-forming polymer (A) with the ester bonds in said polyester resin (B) in the manner of transesterification.

The reaction temperature for the above-mentioned thermal reaction is 130 to 200° C. At below 130° C., the reaction does not proceed to a satisfactory extent, hence the heat-curable, water-dispersible resin composition obtained fails to show improved stability. A temperature exceeding 200° C. may cause coloration of the heat-curable, water-dispersible resin composition obtained, rendering the appearance unfavorable. The above range is thus critical. A preferred range is 140 to 180° C.

In accordance with aspect [II] of the present invention, after the above thermal reaction, the above-mentioned base (C) is added to neutralize at least part of the acid groups contained in the above-mentioned film-forming polymer (A) and thereby cause emulsification, whereby the heat-curable, water-dispersible resin composition of the present invention can easily be obtained.

In accordance with aspect [II] of the present invention, the polymer-to-polymer grafting can be carried out in a simple and easy way by heating for effecting transesterification. Existing facilities can thus be utilized and this is very convenient from the industrial production standpoint.

As a result of neutralization with the base, the heat-curable, water-dispersible resin composition of the present invention is readily dispersed in water, whereby the aqueous resin dispersion of the present invention can be obtained.

The water-based paint composition of the present invention comprises the heat-curable, water-dispersible resin composition detailedly described hereinabove and a curing agent.

Said curing agent includes, among others, amino resins, blocked isocyanates and the like. As specific examples of said amino resins, there may be mentioned dimethylolmelamine, trimethylolmelamine, tetramethylolmelamine, pentamethylolmelamine, hexamethylolmelamine; alkyl ethers thereof such as methyl ether, ethyl ether, propyl ether, isopropyl ether, butyl ether, isobutyl ether, etc.; urea-formaldehyde condensates, urea-melamine condensates, etc.

Even when a hydrophobic melamine is used as the curing agent, the heat-curable, water-dispersible resin composition of the present invention can be stably dispersed in water since it has the above-mentioned grafted structure.

As specific examples of said blocked isocyanates, there may be mentioned, among others, blocked derivatives of polyisocyanates such as aromatic isocyanates, e.g. tolylene diisocyanate, xylylene diisocyanate, diphenylmethanediisocyanate, etc.; alicyclic isocyanates, e.g. methylcyclohexylene-2,4(2,6)-diisocyanate, 1,3(4)-(diisocyanatomethyl)cyclohexane, 4,4-bis(isocyanatocyclohexyl)methane, etc.; aliphatic isocyanates, e.g. hexamethylene diisocyanate, lysine diisocyanate methyl ester, trimethylhexamethylene diisocyanate, etc.; and polyol aducts such as trimethylolpropane adducts, hexanetriol adducts, etc. The blocking agents for the above blocked isocyanates are, for example, oximes such as acetoxime, butanone oxime, etc.; phenols and enols such as phenol, ethyl acetoacetate, etc.: alcohols and amines such as di-n-butylamine, 2,2,2-trifluoroethanol, N,N-dimethylhydrazine, etc.; basic nitrogen-containing compounds such as N,N-diethylhydroxylamine, 3-hydroxypyridine, 3-inethyl-1-phenyl-2-pyrazolin-5-one, 3-methyl-2-pyrazolin-5-one, etc.; caprolactam; acetohydroxamic acid; p-toluenesulfonic acid; and the like.

In the above-mentioned water-based paint composition, such an amino resin and/or isocyanate as mentioned above is preferably used as the curing agent in an amount of 20 to 100 parts by weight per 100 parts by weight of the total resin solids contained therein. At levels below 20 parts by weight, the curing agent cannot provide satisfactory curability whereas, at levels higher than 100 parts by weight, the cured paint films become excessively hard, and brittle as well. A preferred range is 25 to 70 parts by weight.

When supplemented with a polymer thickening agent, the water-based paint composition of the present invention can provide a water-based paint composition (II) which can securely have further improved dispersion stability and workability. As said polymer thickening agent, there may be mentioned acrylic resin particles, among others. The addition of such acrylic resin particles can produce an improvement in workability. The level of addition of said acrylic resin particles is preferably not more than 60% by weight relative to the resin solids content. At levels exceeding 60% by weight, the paint films obtained will have low smoothness.

A pigment may be added to the water-based paint composition or water-based paint composition (II) of the present invention to give a pigment-containing water-based paint composition. As said pigment, there may be mentioned, among others, color pigments such as titanium dioxide, graphite, chromium oxide, iron oxide, carbon black, phthalocyanine pigments, quinacridone pigments, etc.; and extender pigments such as calcium carbonate, magnesium carbonate, barium sulfate, silicate salts, alumina hydrate, calcium sulfate, etc. In cases where said pigment-containing water-based paint composition is to be used as an intermediate coat, it is desirable that an inorganic pigment such as barium sulfate, calcium carbonate, clay or titanium oxide be combinedly used as part of the pigment.

As said pigment, there may further be mentioned glittering pigments. The use of a glittering pigment can convert the pigment-containing water-based paint composition to a water-based metallic paint composition. Examples of said glittering pigment are aluminum flake, mica, tin flake, gold flake, metallic titanium flake, nickel flake and the like.

The level of addition of said glittering pigment is preferably 5 to 60 parts by weight per 100 parts by weight of the total resin solids content.

Said water-based metallic paint composition can suitably be used as a base coat paint.

To the water-based paint composition, water-based paint composition (II) and pigment-containing water-based paint composition of the present invention, there may further be added other additives such as defoaming agents, dispersing agents, surface modifiers, curing catalysts, etc. Said defoaming agents are, for example, silicone defoaming agents, acrylic defoaming agents and the like.

Said surface modifiers are, for example, silicone surface modifiers, acrylic surface modifiers, fluorine-containing surface modifiers and the like.

Said curing catalysts are, for example, phosphate curing catalysts, onium salt curing catalysts and the like.

The water-based paint composition, water-based paint composition (II) and pigment-containing water-based paint composition of the present invention can also take the form of a water-based solid paint composition with a high solids content.

The water-based paint composition, water-based paint composition (II) and pigment-containing water-based paint composition of the present invention are preferably water-based paint compositions in which water, preferably deionized water, is used as the vehicle. When necessary, however, a small proportion of an organic solvent may further be used. As said organic solvent, there may be mentioned, among others, ether alcohols such as ethylene glycol monomethyl ether, ethylene glycol monoethyl ether, ethylene glycol monobutyl ether, etc.; alcohols such as methanol, ethanol, isopropanol, n-butanol, sec-butanol, t-butanol, etc.; esters; ketones and the like.

In accordance with the present invention, the above-mentioned water-based paint composition, water-based paint composition (II) and pigment-containing water-based paint composition can be applied by spray coating, brushing, dipping, roller coating or flow coating, for instance.

In this case, the method of coating articles with the above-mentioned pigment-containing water-based paint composition may be an ordinary one or the so-called two-coat one-bake or two-coat two-bake method which comprises the steps of (I) forming an undercoat film and, when necessary, an intermediate coat film on an article to be coated; (II) applying onto the thus-formed coat said pigment-containing water-based paint composition; (III)

applying a paint composition for clear coating thereonto either after or without curing said pigment-containing water-based paint composition applied in the preceding step; and (IV) curing said clear coat paint composition thus applied, either alone or simultaneously with said pigment-containing water-based paint composition applied in step (II).

Said clear coat paint composition to be used in combination with the pigment-containing water-based paint composition of the present invention may be one in which an aminoplast curing agent such as a melamine resin is used or one in which no aminoplast curing agent is used. As such composition, there may be mentioned, for instance, clear coat paint compositions comprising both a carboxyl group-containing resin and an epoxy group-containing resin. It may also comprise a half-esterified copolymer and an epoxy group-containing acrylic resin. It may also have the form of a powder paint.

The water-based paint composition, water-based paint composition (II) and pigment-containing water-based paint composition of the present invention can be applied to various articles. Said articles are not limited to any particular ones provided that these compositions of the present invention can be cured by heating thereon. Thus, for instance, there may be mentioned automotive parts such as bodies, wheels, bumpers, etc.; household electric appliances such as outdoor equipment of air conditioners; and building materials such as outer wall materials etc.

The heat-curable, water-dispersible resin composition to be used in the practice of the present invention has a structure such that a water-insoluble polyester resin is grafted onto a water-soluble acrylic resin and, as a result, in an aqueous medium, it occurs as particles having a structure such that each particle has a shell or outer layer composed of the acrylic resin taking its position there and a core composed of the polyester resin taking its position within the shell. Therefore, the compatibility between the resins is improved and the dispersion stability is markedly improved. Furthermore, since said particles are small in size, the structural viscosity is increased by the interparticle interaction resulting from the interaction in the hydrophobic shell portion and therefore the antisagging property can be improved even under high humidity conditions.

According to the production method of the present invention, the polymer-to-polymer grafting can expediently be carried out simply by heating, and is very serviceable for industrial-scale production since existing equipment can be utilized as they are.

The water-based paint composition of the present invention has improved stability since the above-mentioned heat-curable, water-dispersible resin composition to be used as a binder has good compatibility with other ingredients such as curing agents. In addition, since the polyester resin in said heat-curable, water-dispersible resin composition is hydrophobic, the water release, or drainage, from paint films is good. Therefore, the phenomenon of poping as resulting from bumping of water in the curing step occurs only very infrequently and the poping during coating operations can also be inhibited. As a result, conditions of wide range are available for good workability. Furthermore, the improved resin-resin and resin-curing agent compatibilities produce improvements in paint film uniformity and, as a result, in paint film transparency, smoothness, chemical resistance, water resistance and mechanical strength as well.

EXAMPLES

The following production examples and working examples are further illustrative of the present invention but are by no means limitative of the scope thereof.

Production Example 1-1

Polyester Resin

A reaction vessel was charged with 613 weight parts of 1,9-nonanediol, 114 weight parts of trimethylolpropane, 105 weight parts of adipic acid, 536 weight parts of phthalic anhydride and 30 weight parts of xylene, and the contents were heated while the reaction byproduct water was removed azeotropically with the xylene.

After the start of the refluxing, the temperature was raised to 190° C. for about 2 hours, and stirring and dehydration were continued until the acid value corresponding to the carboxylic acid function became 85. The mixture was then cooled to 140° C. While maintaining this temperature, 205 weight parts of Cardura E10 (glycidyl versatate; Shell) was added dropwise for 30 minutes. Thereafter, stirring was continued for 2 hours to drive the reaction to completion.

A polyester resin (a) with an acid value of 5 mgKOH/g, a hydroxyl value of 120 mgKOH/g and a number average molecular weight of 2,350 was obtained.

Production Examples 1-2 to 1-5

Polyester Resins

Polyester resins (b) to (e) were obtained in the same manner as in Production Example 1-1 except that the monomer formulations given in Table 1 were employed. The molecular weight, acid value (mgKOH/g) and hydroxyl value (mgKOH/g) of each of the polyester resins (a) to (e) obtained are shown in Table 2.

In Table 1, ND stands for 1,9-nonanediol, Epol for hydrogenated polyisoprene diol (molecular weight=1860, D.P. average=26, Idemitsu Sekiyu Chemicals), HD for 1,6-hexanediol, TMP for trimethylolpropane, PE for pentaerythritol, PAN for phthalic anhydride, ADA for adipic acid, and CaE10 for Cardura E10.

TABLE 1

| Production Example | Polyester resin | Dihydric alcohol | | | Polyhydric alcohol | | Dibasic acid | | Monoepoxy |
|---|---|---|---|---|---|---|---|---|---|
| | | ND | Epol | HD | TMP | PE | PAN | ADA | CaE10 |
| weight parts 1-1 | (a) | 613 (36 mol %) | — | — | 114 (8 mol %) | — | 536 (34 mol %) | 105 (7 mol %) | 205 (15 mol %) |
| 1-2 | (b) | 289 (16 mol %) | — | — | 32 (2 mol %) | — | — | 600 (36 mol %) | 675 (47 mol %) |
| 1-3 | (c) | 738 (44 mol %) | 357 (1 mol %) | — | — | 31 (2 mol %) | — | 809 (53 mol %) | — |
| 1-4 | (d) | — | — | 338 (24 mol %) | 129 (8 mol %) | — | 251 (14 mol %) | 248 (14 mol %) | 579 (39 mol %) |
| 1-5 | (e) | 868 (49 mol %) | — | — | 22 (2 mol %) | — | 133 (8 mol %) | 654 (41 mol %) | — |

TABLE 2

| Production Example | Polyester resin | Molecular weight | Acid value | Hydroxyl value |
|---|---|---|---|---|
| 1-1 | (a) | 2350 | 5 | 120 |
| 1-2 | (b) | 3910 | 5 | 60 |
| 1-3 | (c) | 5730 | 4 | 50 |
| 1-4 | (d) | 450 | 10 | 280 |
| 1-5 | (e) | 13640 | 2 | 20 |

Example 1-1

Polyster-grafted Acrylic Resin and Aqueous Dispersion Thereof

A reaction essel was charged with 400 weight parts of Solvesso-150 (hereinafter referred to as "S-150"; Shoei Chemical Industries), 200 weight parts of methyl isobutyl ketone (MIBK) and 200 weight parts of polyester resin (a) (obtained in Production Example 1). Then, a monomer mixture composed of 166 weight parts of hydroxyethyl acrylate (HEA), 61 weight parts of methacrylic acid (MAA), 520 weight parts of ethylhexyl methacrylate (EHMA) and 53 weight parts of styrene (ST) and 10 weight parts of Kayaester O (t-butyl peroxy-2-ethylhexanoate; Kayaku-Akzo) were added dropwise at a constant rate for 3 hours with stirring at 100° C. Thirty minutes later, 50, weight parts of S-150 and 4 weight parts of Kayaester O were further added dropwise for 30 minutes. Thereafter, the reaction was further effected at that temperature for 1 hour, to give an ester-acrylic resin mixture with an acid value of 41 mgKOH/g, a hydroxyl value of 96 mgKOH/g and a number average molecular weight of 10,000.

This ester-acrylic resin mixture was heated-to 140° C. with stirring, and transesterification was effected at that temperature for 4 hours, to give a polyester-grafted acrylic resin (hereinafter referred to as "polyester-acrylic resin [1]") with an acid value of 41 mgKOH/g, a hydroxyl value of 96 mgKOH/g and a number average molecular weight of 10,000.

The thus-obtained polyester-acrylic resin [1] was heated at 65° C. with stirring and solubilized in water by adding thereto 90 weight parts of dimethanolamine and 3,569 weight parts of deionized water, to give a milky, viscous aqueous dispersion. The solid content of the aqueous dispersion obtained was 20%.

This aqueous dispersion was diluted with deionized water to a viscosity value of 1,000 cps as determined with a type B viscometer at 6 rpm. The yield point as determined by Casson plotting using a type E viscometer was 80 dyne/cm$^2$. The particle size was 120 nm as measured by laser beam scattering method. The dilution was allowed to stand at 40° C. for 10 days and the state of dispersion was evaluated macroscopically. Both directly after dilution and directly after the storage test, a homogeneously dispersed state was observed.

Examples 1-2 to 1-5

Polyester-grafted Acrylic Resins and Aqueous Dispersions Thereof

In Examples 1-2 to 1-5, polyester-grafted acrylic resins (hereinafter respectively referred to as "polyester-acrylic resins [2] to [5]") and aqueous dispersions thereof were obtained in the same manner as in Example 1-1 except that the formulations given in Table 3 were employed. The physical characteristics of the thus-obtained polyester-acrylic resins [2] to [5] are shown in Table 3. In Table 3, LMA stands for lauryl methacrylate, and NBMA for n-butyl methacrylate.

Comparative Example 1-1

Polyester-blended Acrylic Resin and Aqueous Dispersion Thereof

A reaction vessel was charged with 400 weight parts of S-150 and 200 weight parts of MIBK and then a monomer mixture composed of 166 weight parts of hydroxyethyl acrylate, 61 weight parts of methacrylic acid, 520 weight parts of ethylhexyl methacrylate and 53 weight parts of styrene and 10 weight parts of Kayaester O were added dropwise at a constant rate for 3 hours with stirring at 100° C. Thereafter, the reaction was further effected at that temperature for 1 hour to give an acrylic resin with an acid value of 50 mgKOH/g, a hydroxyl value of 100 mgKOH/g and a number average molecular weight of 10,000.

Furthermore, 200 weight parts of the polyester resin (d) obtained in Production Example 1-4 was added to the above acrylic resin, and the mixture was stirred at 80° C. for 1 hour to give a polyester-blended acrylic resin (hereinafter referred to as "polyester-acrylic resin [6]") with an acid value of 41 mgKOH/g, a hydroxyl value of 96 mgKOH/g and a number average molecular weight of 10,000.

The thus-obtained polyester-acrylic resin [6] was heated at 65° C. with stirring and solubilized in water by adding thereto 90 weight parts of dimethanolamine and 3,569 weight parts of deionized water, to give a milky, viscous aqueous dispersion. The solid content of the aqueous dispersion obtained was 20%.

This aqueous dispersion was diluted with deionized water to a viscosity value of 1,000 cps as determined with a type B viscometer at 6 rpm. The yield point as determined by Casson plotting using a type E viscometer was 10 dyne/cm$^2$. The dilution was allowed to stand at 40° C. for 10 days and the state of dispersion was evaluated macroscopically. Although the dispersion was homogeneous directly after dilution, phase separation was observed directly after the storage test.

Comparative Examples 1-2 to 1-4

Polyester-blended Acrylic Resins and Aqueous Dispersions Thereof

In Comparative Examples 1-2 to 1-4, polyester-blended acrylic resins (hereinafter respectively referred to as "polyester-acrylic resins [7] to [9]") and aqueous dispersions thereof were obtained in the same manner as in Comparative Example 1-1 except that the formulations given in Table 4 were employed. The physical characteristics of the thus-obtained polyester-acrylic resins [7] to [9] are shown in Table 4.

Comparative Examples 1-5 and 1-6

Polyester-grafted Acrylic Resins and Aqueous Dispersions Thereof

In Comparative Examples 1-5 and 1-6, polyester-grafted acrylic resins (hereinafter respectively referred to as "polyester-acrylic resins [10] and [11]") and aqueous dispersions thereof were obtained in the same manner as in Comparative Example 1-1 except that the formulations given in Table 4 were employed. The physical characteristics of the thus-obtained polyester-acrylic resins [10] and [11] are shown in table 4.

TABLE 3

|  |  | Example | | | | |
|---|---|---|---|---|---|---|
|  |  | 1-1 | 1-2 | 1-3 | 1-4 | 1-5 |
| Polyester-acrylic resin | | (1) | (2) | (3) | (4) | (5) |
| Formulation (weight parts) | Polyester resin (a) | 200 | — | — | 400 | 450 |
|  | Polyester resin (b) | — | 150 | — | — | — |
|  | Polyester resin (c) | — | — | 300 | — | — |
| Solvent | S-150 | 400 | 400 | 400 | 400 | 400 |
|  | MIBK | 200 | 200 | 200 | 200 | 200 |
| Monomer mixture | HEA | 166 | 176 | 145 | 137 | 137 |
|  | MAA | 61 | 65 | 54 | 55 | 51 |
|  | EHMA | 520 | 510 | — | 120 | 358 |
|  | LMA | — | — | 420 | 240 | — |
|  | ST | 53 | 58 | 81 | 48 | 5 |
|  | NEMA | — | 41 | — | — | — |
| Initiator | Kayaester O | 10 | 20 | 6 | 8 | 3 |
| Content of C6–18 hydrocarbon group-containing monomer (%) | | 52 | 51 | 42 | 36 | 36 |
| Acrylic resin/Polyester resin (weight retio) | | 80/20 | 85/15 | 70/30 | 60/40 | 55/45 |
| Acid Value (mg KOH/g) | | 41 | 44 | 37 | 37 | 34 |
| Hydroxyl value (mg KOH/g) | | 96 | 93 | 88 | 114 | 120 |
| Number average mol. wt. | | 10000 | 6000 | 33000 | 17000 | 80000 |
| Acid group/amine (mole ratio) | | 1/1 | 1/0.6 | 1/0.8 | 1/1.2 | 1/1.8 |
| Solid content (%) | | 20 | 19 | 20 | 21 | 17 |
| Water-dispersibility of resin | Initial | Uniform | Uniform | Uniform | Uniform | Uniform |
|  | After aging | Uniform | Uniform | Uniform | Uniform | Uniform |
| Yield point (dyne/cm$^2$) | | 80 | 100 | 70 | 60 | 60 |

TABLE 4

|  |  | Comparative Example | | | | | |
|---|---|---|---|---|---|---|---|
|  |  | 1-1 | 1-2 | 1-3 | 1-4 | 1-5 | 1-6 |
| Polyester-acrylic resin | | (6) | (7) | (8) | (9) | (10) | (11) |
| Formulation (weight parts) | Polyester resin (a) | — | — | 200 | 200 | 550 | 150 |
|  | Polyester resin (b) | 200 | — | — | — | — | — |
|  | Polyester resin (c) | — | 200 | — | — | — | — |
| Solvent | S-150 | 400 | 400 | 400 | 400 | 400 | 400 |
|  | MIBK | 200 | 200 | 200 | 200 | 200 | 200 |
| Monomer mixture | HEA | 166 | 166 | 166 | 166 | 112 | 176 |
|  | MAA | 61 | 61 | 61 | 61 | 41 | 65 |
|  | EHMA | 520 | 520 | 520 | 520 | 293 | 41 |
|  | LMA | — | — | — | — | — | — |
|  | ST | 53 | 53 | 53 | 53 | 4 | 58 |
|  | NBMA | — | — | — | — | — | 510 |
| Initiator | Kayaester O | 10 | 10 | 30 | 3 | 10 | 20 |
| Content of C6–18 hydrocarbon group-containing momoner (%) | | 52 | 52 | 52 | 52 | 29 | 4 |
| Acrylic resin/Polyester resin (weight retio) | | 80/20 | 80/20 | 80/20 | 80/20 | 45/55 | 85/15 |
| Acid Value (mg KOH/g) | | 42 | 40 | 41 | 41 | 28 | 44 |
| Hydroxyl value (mg KOH/g) | | 136 | 84 | 96 | 96 | 120 | 93 |
| Number average mol. wt. | | 10000 | 10000 | 4000 | 110000 | 10000 | 6000 |
| Acid group/amine (mole ratio) | | 1/1 | 1/1 | 1/1 | 1/1 | 1/0.39 | 1/1 |
| Solid content (%) | | 20 | 20 | 22 | 18 | 20 | 21 |
| Water-dispersibility of resin | Initial | Uniform | Uniform | Uniform | Uniform | Uniform | Uniform |
|  | After aging | Separation | Separation | Separation | Separation | Separation | Uniform |
| Yield point (dyne/cm$^2$) | | 10 | 15 | 5 | 15 | 10 | 0 |

Examples 1-6
Water-dispersible Resin Composition and Aqueous Dispersion Thereof

Thirty weight parts of Cymel 212 (C-212; Mitsui Toatsu Chemicals) was added to and homogeneously mixed with 369 weight parts of the aqueous dispersion obtained in Example 1-1. Then, 4 weight parts of paratoluenesulfonic acid (40% ethanolic solution) was added to and homogeneously mixed with the above mixture and then diluted with deionized water so that the resultant dilution had a viscosity of 1,000 cps as measured with a type B viscometer at 6 rpm. The solid content of the dilution was 23%. The yield point as determined by Casson plotting using a type E viscometer was 70 dyne,/cm$^2$.

The thus-obtained solution was applied by flow coating to test panels having an intermediate coat to a film thickness of 30 μm, followed by baking at 140° C. for 25 minutes, to give clear paint films. The films were evaluated by the methods mentioned below. The results are shown in Table 5. Separately, the state of dispersion was macroscopically evaluated after dilution and after 10 days of standing at 40° C. Both directly after dilution and after storage testing, a uniform state of dispersion was observed.

Methods of evaluation

1. Solvent resistance

Six drops of butyl diglycol (BDG) were allowed to fall onto the paint film surface obtained and left as they were for 24 hours. The film surface did not show any change, proving its good solvent resistance. The evaluation criteria were as follows: no abnormality—○; uneven luster or discoloration—x.

2. Water resistance

The cured paint films were immersed in water at 40° C. for 10 days. The water resistance of the film surface was evaluated by checking said surface for change. The paint films did not show any change, proving their good water resistance. The evaluation criteria were as follows: no abnormality—○; uneven luster or discoloration—x .

Examples 1-7 to 1-10 and Comparative Examples 1-7 to 1-12

Water Dispersible Resin Compositions and Aqueous Dispersions Prepared Therefrom

Aqueous dispersions were produced in the same manner as in Example 1-6, except that the formulations shown in Tables 5 and 6 were employed. They were evaluated from the viewpoints of dispersion stability, yield point, paint film appearance, solvent resistance and water resistance. The results are shown in Tables 5 and 6. The solid contents of the water-dispersible resin compositions obtained are also shown in Tables 5 and 6.

TABLE 5

|  |  |  | Example | | | | |
|---|---|---|---|---|---|---|---|
|  |  |  | 1-6 | 1-7 | 1-8 | 1-9 | 1-10 |
| Formulation (weight parts) | Polyester- acrylic resin | (1) | 369 | — | — | — | — |
|  |  | (2) | — | 369 | — | — | — |
|  |  | (3) | — | — | 369 | — | — |
|  |  | (4) | — | — | — | 369 | — |
|  |  | (5) | — | — | — | — | 369 |
|  | C-212 |  | 30 | 30 | 30 | 30 | 30 |
|  | Solid content (%) |  | 23 | 22 | 23 | 24 | 20 |
| Water- despersibility of resin | Initial | | Uniform | Uniform | Uniform | Uniform | Uniform |
|  | After aging | | Uniform | Uniform | Uniform | Uniform | Uniform |
|  | Yield point (dyne/cm$^2$) | | 70 | 80 | 60 | 50 | 55 |
| Paint film performance characteristics | Appearance | | Clear | Clear | Clear | Clear | Clear |
|  | Solvent resistance | | ○ | ○ | ○ | ○ | ○ |
|  | Water resistance | | ○ | ○ | ○ | ○ | ○ |

TABLE 6

|  |  |  | Comparative Example | | | | | |
|---|---|---|---|---|---|---|---|---|
|  |  |  | 1-7 | 1-8 | 1-9 | 1-10 | 1-11 | 1-12 |
| Formulation (weight parts) | Polyester- acrylic resin | (6) | 369 | — | — | — | — | — |
|  |  | (7) | — | 369 | — | — | — | — |
|  |  | (8) | — | — | 369 | — | — | — |
|  |  | (9) | — | — | — | 369 | — | — |
|  |  | (10) | — | — | — | — | 369 | — |
|  |  | (11) | — | — | — | — | — | 369 |
|  | C-212 |  | 30 | 30 | 30 | 30 | 30 | 30 |
|  | Solid content (%) |  | 23 | 23 | 25 | 21 | 23 | 24 |
| Water- despersibility of resin | Initial | | Uniform | Uniform | Uniform | Uniform | Uniform | Uniform |
|  | After aging | | Separate | Separate | Separate | Separate | Separate | Separate |
|  | Yield point (dyne/cm$^2$) | | 5 | 10 | 0 | 10 | 5 | 0 |
| Paint film performance characteristics | Appearance | | Clear | Cloudy | Clear | Clear | Clear | Clear |
|  | Solvent resistance | | x | x | x | x | x | ○ |
|  | Water resistance | | x | x | x | x | x | ○ |

Production Examples 2-1 and 2-2

Polyester-grafted Acrylic Resins and Aqueous Dispersions Thereof

The polyester-grafted acrylic resin of Production Example 2-1 and the polyester-grafted acrylic resin of Production Example 2-2 (hereinafter respectively referred to as "polyester-acrylic resin [12] and polyester-acrylic resin [13]") and aqueous dispersions thereof were produced in the same manner as in Example 1-1 except that the formulations shown in table 7 were employed.

Typical characteristics of the thus-obtained polyester-acrylic resins [12] and [13] and aqueous dispersions thereof are shown in Table 7. In Table 7, LMA stands for lauryl methacrylate.

Production Example 2-3
Polyester-blended Acrylic Resin and Aqueous Dispersion Thereof A reaction vessel was charged with 400 weight parts of S-150 and 200 weight parts of MIBK. Thereto was added dropwise at a constant rate for 3 hours with stirring at 100° C. a mixture of 166 weight parts of hydroxyethyl acrylate, 61 weight parts of methacrylic acid, 520 weight parts of ethylhexyl methacrylate and 53 weight parts of styrene as supplemented with 10 weight parts of Kayaester O. Then, 50 weight parts of S-150 and 4 weight parts of Kayaester O were further added dropwise for 30 minutes. The reaction was further effected at that temperature for 1 hour to give an acrylic resin with an acid value of 50 mgKOH/g, a hydroxyl value of 100 mgKOH/g and a number average molecular weight of 10,000.

To the thus-obtained acrylic resin was further added 200 weight parts of polyester resin (a) obtained in Production Example 1-1. The whole was stirred at 80° C. for 1 hour to give a polyester-blended acrylic resin (hereinafter referred to as "polyester-acrylic resin [14]"). Typical characteristics of this resin are shown in Table 7.

The thus-obtained polyester-acrylic resin [14] was heated at 65° C. with stirring and solubilized in water by adding 90 weight parts of dimethanolamine and 2,274 weight parts of deionized water, to give a milky, viscous aqueous dispersion.

The solid content of the aqueous dispersion obtained was 25%.

TABLE 7

|  |  |  | Production Example | | |
|---|---|---|---|---|---|
|  |  |  | 2-1 | 2-2 | 2-3 |
| Polyester-acrylic resin |  |  | (12) | (13) | (14) |
| Formulation (weight parts) | Polyester resin (a) |  | — | 550 | 200 |
|  | Polyester resin (c) |  | 300 | — | — |
|  | Solvent | S-150 | 400 | 400 | 400 |
|  |  | MIEK | 200 | 200 | 200 |
|  | Monomer mixture | HEA | 145 | 112 | 166 |
|  |  | MAA | 54 | 41 | 61 |
|  |  | EHMA | — | 293 | 520 |
|  |  | LMA | 420 | — | — |
|  |  | ST | 81 | 4 | 53 |
|  | Initiator | Kayaester O | 6 | 10 | 10 |
| Content of C6–18 hydrocarbon group-containing monomer (%) |  |  | 42 | 29 | 52 |
| Acrylic resin/Polyester resin (weight ratio) |  |  | 70/30 | 45/55 | 80/20 |
| Acid Value (mgKCH/g) |  |  | 37 | 28 | 41 |
| Hydroxyl value (mgKCH/g) |  |  | 88 | 120 | 96 |
| Number average mol. wt. |  |  | 33000 | 10000 | 10000 |
| Solid content (%) |  |  | 25 | 25 | 25 |

Production Example 2-4
Resin for Dispersing

A reaction vessel was charged with 400 weight parts of diethyleneglycol monobutyl ether (BDG). To this was added dropwise at a constant rate for 3 hours with stirring at 100° C. a mixture of 100 weight parts of styrene, 172 weight parts of methyl methacrylate, 230 weight parts of lauryl acrylate, 219 weight parts of methyl acrylate, 218 weight parts of Placcel FM-1 (Daicel Chemical Industries), 61 weight parts of methacrylic acid and 10 weight parts of Kayaester O. Thirty minutes later, 50 weight parts of BDG and 3 weight parts of Kayaester O were further added dropwise for 30 minutes, and the reaction was further effected at that temperature for 1 hour to give an acrylic resin (hereinafter referred to as "resin for dispersing") with an acid value of 40 mgKOH/g, a hydroxyl value of 50 mgKOH/g and a number average molecular weight of 17,000.

The thus-obtained resin for dispersing was stirred at 85° C. and solubilized in water by adding 87 weight parts of triethylamine and 2,952 weight parts of deionized water to give a clear, viscous aqueous solution. The solid content of this aqueous solution was 22%.

Production Example 2-5
Resin for Thickening

A reaction vessel was charged with 180 weight parts of deionized water, 10 weight parts of styrene, 0.7 weight part of methacrylic acid and 0.7 weight part of dimethanolamine, and the charge was heated to 83° C. Then, a solution of 0.5 weight part of 4,4'-azobis-4-cyanovaleric acid, neutralized with 0.87 weight part of dimethylethanolamine and dissolved in 5 weight parts of deionized water was added dropwise for 20 minutes. Furthermore, a mixture of 84.3 weight parts of styrene, 5 weight parts of methacrylic acid and 5 weight parts of dimethylethanolamine and a solution of 0.5 weight part of 4,4'-azobis-4-cyanovaleric acid, neutralized with 0.27 weight part of dimethylethanolamine and dissolved in 40 weight parts of deionized water were added dropwise for 2 hours, followed by 1 hour of continued stirring, to give a white emulsion (hereinafter referred to as "resin for thickening"). This emulsion had a solid content of 30% and a particle size of 330 nm (laser beam scattering method).

Production Example 2-6
Pigment Dispersion Paste (1)

Polyester-acrylic resin [12] (obtained in Production Example 2-2; 186 weight parts), 20 weight parts of Blue A3RN (blue pigment; Ciba-Geigy Japan) and 15 weight parts of deionized water were weighed and placed in a hermetically closable 1.5-liter stainless steel vessel, and 480 cc of glass beads were added. Following premixing using an agitator, mixing and dispersion was effected for 2 hours using a paint conditioner, to give a pigment dispersion paste (1).

Examples 2-1 to 2-4 and Comparative Examples 2-1 and 2-2

Water-based metallic base paints ① to ⑥ were prepared according to the formulations shown in Table 8. Polyester-acrylic resin [1] was adjusted to a solid content of 25% by adding 2,274 weight parts of deionized water, prior to use.

The aluminum flake pigment (Alumipaste NW-91-2061, 62% aluminum metal flake pigment; Toyo Aluminium) was uniformly admixed in advance with the resin for dispersing and, when necessary, with pigment dispersion paste (1). The polyester-acrylic resin component and curing agent were also mixed together beforehand. In particular, when a melamine resin was used as the curing agent, it was solubilized in water together with the polyester-acrylic resin when the latter was solubilized in water, and the resulting mixture was then homogeneously mixed with the dispersion paste. Furthermore, the additive and thickening agent were added, and the water-based metallic base paints were prepared at room temperature using an agitator. The aluminum flake pigment was used in a proportion of 11.4 to 12.5 weight parts per 100 weight parts of the resin solids. In Table 8, C-212 stands for Mitsui-Cytec's melamine resin curing agent, BL-116 for Sumitomo-Bayer's blocked isocyanate curing agent, and BYK for Byk Chemie Japan's silicone defoaming agent. PWC denotes the pigment content (% by weight).

Two sets of coating conditions were employed: temperature—25° C. and humidity—65% or 85%.

The storage stability of each water-based metallic base paint was also evaluated by the method mentioned below. The results are also shown in Table 9.

TABLE 8

| | | | Example | | | | Comparative Example | |
|---|---|---|---|---|---|---|---|---|
| | | | 2-1 | 2-2 | 2-3 | 2-4 | 2-1 | 2-2 |
| Water-based metallic base paint | | | ① | ② | ③ | ④ | ⑤ | ⑥ |
| Formulation (weight parts) | Polyester-acrylic resin | (1) | 700 | — | 479 | — | — | — |
| | | (12) | — | 700 | — | 684 | — | — |
| | | (13) | — | — | — | — | 700 | — |
| | | (14) | — | — | — | — | — | 700 |
| | Curing agent | C-212 | 86 | 86 | — | 115 | 86 | 86 |
| | | BL-116 | — | — | 164 | — | — | — |
| | Pigment dispersion paste (1) | | — | — | — | 22 | — | — |
| | Aluminum flake pigment | | 54 | 54 | 54 | 54 | 54 | 54 |
| | Resin for dispersing | | 71 | 71 | 71 | 71 | 71 | 71 |
| | BYK-341 | | 2 | 2 | 2 | 2 | 2 | 2 |
| | Resin for thickening | | 84 | 84 | 84 | 84 | 84 | 84 |
| | PWC (%) | | 10.0 | 10.0 | 10.8 | 9.6 | 10.0 | 10.0 |

Production Example 2-7
Clear Paint (C-1)

A reaction vessel was charged with 900 weight parts of xylene and the xylene was heated to 100° C. Thereto was then added dropwise at a constant rate for 3 hours a mixed solution composed of 12 weight parts of methacrylic acid, 264 weight parts of styrene, 264 weight parts of methyl methacrylate, 360 weight parts of n-butyl acrylate, 100 weight parts of 2-hydroxyethyl acrylate and 10 weight parts of azobisisobutyronitrile. Further, a solution composed of 3 weight parts of azobisisobutyronitrile and 100 weight parts of xylene was added dropwise for 30 minutes. The reaction was further continued for 2 hours to give an acrylic resin solution with a nonvolatile matter content of 50% and a number average molecular weight of 8,000.

A clear paint (C-1) was prepared by incorporating 36 weight parts of U-Van 20SE-60 (Mitsui Toatsu Chemicals) and 0.5 weight part of Modaflow (Monsanto) into 100 weight parts of the above acrylic resin.

Examples 2-5 to 2-8 and Comparative Examples 2-3 and 2-4

One weight part of Nacure 5225 (amine-blocked acid catalyst; King Industries Inc.) was added to each of the above water-based metalic base paints ①, ② and ④ to ⑥, and the mixture was adjusted to a viscosity of 60 seconds as determined with a No. 4 Ford cup by diluting with deionized water. The viscosity of water-based metallic base paint ③ was adjusted in the same manner without addition of Nacure 5225. The thus-viscosity-adjusted water-based metallic base paints ① to ⑥ were each applied, by spray coating, to steel panels provided in advance with an intermediate coat, to a dry film thickness of 10 to 50 μm, followed by drying at 80° C. for 10 minutes.

Then, clear paint (C-1) was applied to a dry film thickness of 40 μm. After 5 minutes of setting, the base coat and clear coat were simultaneously baked at 140° C. for 30 minutes.

The paint films of Examples 2-5 to 2-8 and Comparative Examples 2-3 and 2-4 were evaluated with respect to finish appearance, water resistance and solvent resistance by the methods mentioned below. The results are shown in Table 9.

Evaluation methods
1. Film thickness critical for sagging

The maximum film thickness at which any paint film defect due to sagging was not observed when a gradient coat was provided which had a thinnest portion thickness of 10 μm and a thickest portion thickness of 50 μm was defined as the film thickness critical for sagging. When the critical film thickness for sagging was not less than 25 μm, the test paint was regarded as passing the test. The paint films of Examples 2-5 to 2-8 all passed the test.

2. Film thickness critical for poping

The maximum film thickness at which any paint film defect due to poping was not observed when a gradient coat was provided which had a thinnest portion thickness of 10 μm and a thickest portion thickness of 50 μm was defined as the film thickness critical for poping. When the critical film thickness for poping was not less than 25 μm, the test paint was regarded as passing the test. The paint films of Examples 2-5 to 2-8 all passed the test.

3. Paint film appearance

The paint film appearance was evaluated by macroscopic observation and in terms of flip-flop value as measured using a metallic appearance tester. The evaluation criteria were as follows:

○: Good (good orientation of aluminum, with a flip-flop value not less than 30 as measured using a metallic appearance tester);

Δ: Rather poor (rather poor orientation of aluminum, with a flip-flop value less than 30 but not less than 25);

x: Poor (disturbed orientation of aluminum, with a flip-flop value less than 25).

4. Solvent resistance

The soluble matter was extracted from a specified amount of the cured paint film for 1 hour using a Soxhlet extractor under refluxing of acetone. The test paint film was regarded as passing the test (○) when the extraction rate was less than 5%, and as failing to pass the test (x) when-said rate was 5% or higher.

5. Water resistance

The cured paint film was immersed in water at 40° C. for 10 days and the water resistance of the paint film was evaluated by observing the film surface as to whether there was any change. No abnormality was expressed by ○ and uneven luster or discoloration by x.

6. Storage stability

The initial stability directly after dilution and the aging stability after 10 days of standing at 40° C. of the resin after dilution were evaluated macroscopically.

tion of the dropping, the reaction was continuedly effected at 125° C. for additional 2 hours, to give an acrylic resin varnish with a nonvolatile matter content of 59% and a number average molecular weight of 4,000.

TABLE 9

|  |  |  | Example | | | | Comparative Example | |
|---|---|---|---|---|---|---|---|---|
|  |  |  | 2-5 | 2-6 | 2-7 | 2-8 | 2-3 | 2-4 |
|  | Clear paint |  |  |  | (C-1) |  |  |  |
|  | Water-based metallic base paint |  | ① | ② | ③ | ④ | ⑤ | ⑥ |
| 65% humidity | Critical film thickness for sagging (μm) |  | 40 | 45 | 45 | 40 | 10 | 25 |
|  | Critical film thickness for poping (μm) |  | 40 | 40 | 40 | 40 | 20 | 35 |
|  | Paint film performance characteristics | Appearance (flip-flop effect) | ○ | ○ | ○ | ○ | Δ | x |
|  |  | Solvent resistance | ○ | ○ | ○ | ○ | x | x |
|  |  | Water resistance | ○ | ○ | ○ | ○ | x | x |
| 85% humidity | Critical film thickness for sagging (μm) |  | 35 | 40 | 40 | 35 | <10 | 15 |
|  | Critical film thickness for poping (μm) |  | 35 | 35 | 35 | 35 | 15 | 30 |
|  | Paint film Appearance (flip-flop effect) |  | ○ | ○ | ○ | ○ | x | x |
| Storage stability | Initial |  | Uniform | Uniform | Uniform | Uniform | Uniform | Uniform |
|  | After aging |  | Uniform | Uniform | Uniform | Uniform | Partial precipitation | Separate |

Examples 2-9 to 2-12 and Comparative Examples 2-5 and 2-6

Water-based metallic base paints ⑦ to ⑫ were prepared in the same manner as in Examples 2-5 to 2-8 except that the formulations shown in Table 10 were employed.

2. Production of anhydrocarboxyl group-containing polymer

A reaction vessel was charged with 80 weight parts of xylene and, after the temperature was raised to 115° C., a mixed solution composed of 25 weight parts of styrene, 21 weight parts of n-butyl acrylate, 95 weight parts of n-butyl methacrylate, 34 weight parts of 2-ethylhexyl acrylate, 50

TABLE 10

|  |  |  | Example | | | | Comparative Example | |
|---|---|---|---|---|---|---|---|---|
|  |  |  | 2-9 | 2-10 | 2-11 | 2-12 | 2-5 | 2-6 |
| Water-based metallic base paint |  |  | ⑦ | ⑧ | ⑨ | ⑩ | ⑪ | ⑫ |
| Formulation (weight parts) | Polyester-acrylic resin | (1) | 700 | — | 600 | 600 | — | — |
|  |  | (12) | — | 479 | — | — | — | — |
|  |  | (13) | — | — | — | — | — | 700 |
|  |  | (14) | — | — | — | — | 479 | — |
|  | Curing agent | C-212 | 71 | — | 100 | 114 | — | 86 |
|  |  | BL-116 | — | 164 | — | — | 164 | — |
|  | Aluminum flake pigment |  | 54 | 54 | 54 | 54 | 54 | 54 |
|  | Resin for dispersing |  | 71 | 71 | 71 | 71 | 71 | 71 |
|  | BYK-341 |  | 2 | 2 | 2 | 2 | 2 | 2 |
|  | Resin for thickening |  | 84 | 84 | 84 | 84 | 84 | 84 |
|  | PWC (%) |  | 10.4 | 10.8 | 10.3 | 9.9 | 10.5 | 10.0 |

Production Example 2-8
Clear Paint (C-2)
1. Production of acrylic resin varnish

A reaction vessel was charged with 500 weight parts of butyl acetate and, after the temperature was raised to 125° C., a mixed solution composed of 50 weight parts of styrene, 400 weight parts of glicidyl methacrylate, 26.4 weight parts of methyl methacrylate, 200 weight parts of 2-ethylhexyl acrylate, 350 weight parts of 2-hydroxyethyl acrylate and 70 weight parts of t-butyl peroxy-2-ethylhexanoate (Kayaester O) was added dropwise at a constant rate for 3 hours. After completion of the dropping, the temperature of 125° C. was maintained for 30 minutes and then a solution composed of 10 weight parts of Kayaester O and 250 weight parts of xylene was added dropwise for 80 minutes. After compleweight parts of itaconic anhydride, 100 weight parts of propylene glycol monomethyl ether acetate and 10 weight parts of Kayaester O was added dropwise at a constant rate for 3 hours. After completion of the dropping, stirring was continued at 115° C. for further 2 hours to give an anhydrocarboxyl group-containing polymer with a nonvolatile matter content of 53% and a number average molecular weight of 5,500.

3. Production of half-esterified polymer

A solution of 1.35 weight parts of triethylamine in 35 weight parts of butyl acetate, and 18.2 weight parts of methanol were added to 385 weight parts of the anhydrocarboxyl group-containing polymer obtained as described above in section 2, and the reaction was allowed to proceed at 40° C. for 12 hours. Complete disappearance of the absorption (1785 cm$^{-1}$) indicative of an acid anhydride group was confirmed by IR spectrometry. The corresponding half-esterified polymer was thus obtained.

4. Production of clear paint (C-2)

A clear paint (C-2) was produced by placing 100 weight parts of the acrylic resin varnish obtained as described above in section 1, 133 weight parts of the half-esterified polymer obtained as described above in 3, 0.3 weight part of tetrabutylammonium bromide, 1.2 weight parts of Tinuvin 900 (benzotriazole ultraviolet absorber; Ciba-Geigy) and 0.6 weight part of Sanol LS-292 (hindered amine light stabilizer; Sankyo) in a stainless steel vessel and stirring the contents using an experimental agitator. This was diluted to a paint viscosity with a thinner composed of butyl acetate and xylene (1:1).

Examples 2-13 and 2-14 and Comparative Example 2-7

On weight part of Nacure 5225 (amine-blocked acid catalyst; King Industries Inc.) was added to water-based metallic base paint ⑦ (obtained in Example 2-9) and then the mixture was adjusted to a viscosity of 60 seconds as determined using a No. 4 Ford cup by diluting with deionized water. Water-based metallic base paint ⑧ (obtained in Example 2-10) and water-based metallic base paint ⑪ (obtained in Comparative Example 2-5) were adjusted to the same viscosity in the same manner without addition of Nacure 5225.

The thus-viscosity-adjusted water-based metallic base paints ⑦, ⑧ and ⑪ were each applied by spray coating to steel panels provided with an intermediate coat in advance, to a dry film thickness of 10 to 50 μm and dried at 80° C. for 10 minutes.

Then, clear paint (C-2) was applied to each panel to a dry film thickness of 40 μm. After 5 minutes of setting, the base coat and clear coat were simultaneously baked at 140° C. for 30 minutes.

The paint films of Examples 2-13 and 2-14 and Comparative Example 2-7 were evaluated with respect to finish film appearance, water resistance and solvent resistance in the same manner as in Example 2-5. The results are shown in Table 11. Two sets of coating conditions were employed, namely a temperature of 25° C. and a humidity of 65% or 85%.

The storage stability of each water-based metallic base paint used was also evaluated in the same manner as in Example 2-5. The results are also shown in Table 11.

Production Example 2-9
Powder Clear Paint
1. Production of acrylic resin varnish A reaction vessel was charged with 630 weight parts of xylene and the temperature was raised to 130° C. Using a dropping funnel, a mixed solution composed of 200 weight parts of styrene, 450 weight parts of glycidyl methacrylate, 270 weight parts of methyl methacrylate, 80 weight parts of isobutyl methacrylate and 75 weight parts of Kayaester O was added dropwise at a constant rate for 3 hours. After completion of the dropping, the temperature was maintained for 30 minutes and then a solution composed of 1 weight part of Kayaester O and 70 weight parts of xylene was further added dropwise for 30 minutes. After completion of the dropping, the reaction was allowed to proceed at 130° C. for further 1 hour. Removal of the xylene by distillation under reduced pressure gave an acrylic resin varnish.

2. Production of powder clear paint

Seventy weight parts of the thus-obtained acrylic resin varnish, 19.1 weight parts of decanedicarboxylic acid, 0.11 weight part of CF-1056 (Toray Dow Corning Silicone) and 0.89 weight part of benzoin were mixed up by the dry method using a Henschel mixer (Mitsui Miike Machinery). Then, using a PR-46 cokneader (Buss, Switzerland), dissolution and dispersion was effected at 100° C., followed by cooling, grinding in a hammer mill and classified with a 150-mesh wire netting, to give a powder acrylic clear paint.

Examples 2-15 and 2-16 and Comparative Example 2-8

One weight part of Nacure 5225 (amine-blocked acid catalyst; King Industries Inc.) was added to each of the water-based metallic base paints ⑨, ⑩ and ⑫ respectively obtained in Examples 2-11 and 2-12 and Comparative Example 2-6 and then each mixture was adjusted to a viscosity of 60 seconds as determined with a No. 4 Ford cup by diluting with deionized water and applied by spray coating to steel panels provided with an intermediate coat in advance, to a dry film thickness of 10 to 50 μm and dried at 80° C. for 10 minutes.

Then, the powder clear paint was applied to a dry film thickness of 40 μm by electrostatic spray coating, and the base coat and clear coat were simultaneously baked at 150° C. for 30 minutes.

The paint films of Examples 2-15 and 2-16 and Comparative Example 2-8 were evaluated with respect to finish appearance, water resistance and solvent resistance in the same manner as in Example 2-5. The results are shown in Table 11. Two sets of coating conditions were employed, namely a temperature of 25° C. and a humidity of 65% or 85%, were employed.

The storage stability of each water-based metallic base paint used was evaluated in the same manner as in Example 2-5. The results are also shown in Table 11.

TABLE 11

| | | Example | | Comparative Example | Example | | Comparative Example |
|---|---|---|---|---|---|---|---|
| | | 2-13 | 2-14 | 2-7 | 2-15 | 2-16 | 2-8 |
| | Clear paint | | (C-2) | | | Powder clear paint | |
| | Water-based metallic base paint | ⑦ | ⑧ | ⑪ | ⑨ | ⑩ | ⑫ |
| 65% humidity | Critical film thickness for sagging (μm) | 40 | 45 | 25 | 40 | 45 | 10 |
| | Critical film thickness for poping (μm) | 40 | 40 | 35 | 40 | 40 | 20 |
| Paint film performance | Appearance (flip-flop effect) | ○ | ○ | x | ○ | ○ | Δ |

TABLE 11-continued

|  |  | Example | | Comparative Example | Example | | Comparative Example |
|---|---|---|---|---|---|---|---|
|  |  | 2-13 | 2-14 | 2-7 | 2-15 | 2-16 | 2-8 |
| | characteristics Solvent resistance | ○ | ○ | x | ○ | ○ | x |
| | Water resistance | ○ | ○ | x | ○ | ○ | x |
| 85% humidity | Critical film thickness for sagging (μm) | 35 | 40 | 15 | <35 | 40 | <10 |
| | Critical film thickness for poping (μm) | 35 | 35 | 30 | 35 | 35 | 15 |
| | Paint film Appearance (flip-flop effect) | ○ | ○ | x | ○ | ○ | x |
| Storage stability | Initial | Uniform | Uniform | Uniform | Uniform | Uniform | Uniform |
| | After aging | Uniform | Uniform | Separation | Uniform | Uniform | Partial precipitation |

Production example 2-10

Pigment Dispersion Paste (2)

350 weight parts of the polyester-acrylic resin [1] of Example 1-1 (after solid content adjustment to 25%) and 175 weight parts of Blue A3RN (blue pigment; Ciba-Geigy Japan) were weighed and placed in a hermetically closable 3.0-liter stainless steel vessel, 1,000 cc of glass beads were added. After premixing using an agitator, mixing and dispersion was effected using a paint conditioner for 2 hours to give a pigment dispersion paste (2).

Examples 2-17 to 2-19 and Comparative Example 2-9

According to the formulations shown in Table 12, water-based solid base paints [I] to [IV] were prepared at room temperature using an agitator.

TABLE 12

|  |  | | Example | | | Comparatovem |
|---|---|---|---|---|---|---|
|  |  | | 2-17 | 2-18 | 2-19 | 2-9 |
| | Water-based solid base paint | | [I] | [II] | [III] | [IV] |
| Formulation | Polyester- | (1) | 350 | — | — | — |
| (weight parts) | acrylic resin | (12) | — | 350 | 350 | — |
| | | (14) | — | — | — | 350 |
| | Curing agent | C-212 | 75 | 75 | — | 75 |
| | | BL-116 | — | — | 240 | — |
| | Pigment dispersion paste (2) | | 525 | 525 | 525 | 525 |
| | BYK-341 | | 2 | 2 | 2 | 2 |
| | Resin for thickening | | 74 | 74 | 74 | 74 |
| | PWC (%) | | 50 | 50 | 50 | 50 |

One weight part of Nacure 5225 (amine-blocked acid catalyst; King Industries Inc.) was added to each of the thus-obtained water-based solid base paints [I], [II] and [IV] of Examples 2-17 and 2-18 and Comparative Example 2-9 and each mixture was adjusted to a viscosity of 60 seconds as determined with a No. 4 Ford cup by diluting with deionized water. Water-based solid base paint [III] (obtained in Example 2-19) was subjected to viscosity adjustment in the same manner without addition of Nacure 5225. The thus-viscosity-adjusted water-based solid base paints [I] to [IV] were each applied by spray coating to steel panels provided in advance with an intermediate coat, to a dry film thickness of 10 to 50 μm and dried at 80° C. for 10 minutes.

Then, clear paint (C-1) was applied to a dry film thickness of 40 μm. After 5 minutes of setting, the base coat and clear coat were simultaneously baked at 140° C. for 30 minutes and each of the paint films of Examples 2-17 to 2-19 and Comparative Example 2-9 was evaluated with respect to water resistance and solvent resistance in the same manner as in Example 2-5. Each paint film was also evaluated with respect to appearance (gloss) by the method mentioned below. The results are shown in Table 13. Two sets of coating conditions, namely a temperature of 25° C. and a humidity of 65% or 85%, were employed.

The storage stability of each water-based solid base paint used was also evaluated in the same manner as in Example 2-5. The results are shown in Table 13.

Evaluation method

1. Gloss (60° gloss)

The appearance of the paint film was evaluated by measuring the gloss of the coat surface using a digital variable-angle gloss meter (Suga Testing Machine). The following evaluation criteria were used:

⊙: Not less than 90;

○: Not less than 85 but less than 90;

Δ: 80 to 85;

x: Not more than 80.

TABLE 13

|  | Example | | | Comparative Example |
|---|---|---|---|---|
|  | 2-17 | 2-18 | 2-19 | 2-9 |
| clear paint | | (C-1) | | |
| Water-based solid base paint | [I] | [II] | [III] | [IV] |

TABLE 13-continued

| | | Example | | | Comparative Example |
|---|---|---|---|---|---|
| | | 2-17 | 2-18 | 2-19 | 2-9 |
| 65% humidity | Critical film thickness for sagging (μm) | 40 | 45 | 45 | 25 |
| | Critical film thickness for poping (μm) | 40 | 40 | 40 | 35 |
| | Paint film performance characteristics — Appearance (gloss) | ⊚ | ⊚ | ⊚ | X |
| | Solvent resistance | ○ | ○ | ○ | X |
| | Water resistance | ○ | ○ | ○ | X |
| 85% humidity | Critical film thickness for sagging (μm) | 35 | 40 | 40 | 15 |
| | Critical film thickness for poping (μm) | 35 | 35 | 35 | 30 |
| | Paint film Appearance (gloss) | ⊚ | ⊚ | ⊚ | X |
| Storage stability | Initial | Uniform | Uniform | Uniform | Uniform |
| | After aging | Uniform | Uniform | Uniform | Partial precipitation |

We claim:

1. A method of coating which comprises the steps of:
   (I) forming an undercoat film and, optionally, an intermediate coat film on an article to be coated;
   (II) applying onto the thus-formed coat at least one pigment-containing water-based paint composition selected from the group consisting of
       a pigment-containing water-based paint composition which comprises
           a water-based paint composition which comprises
               a heat-curable, water-dispersible resin composition comprising
                   50 to 90% by weight of a film-forming polymer (A) obtained by copolymerizing an ethylenic monomer having a saturated hydrocarbon group having 6 to 18 carbon atoms, a hydroxy-containing ethylenic monomer, an acidic group-containing ethylenic monomer and another ethylenic monomer, and
                   50 to 10% by weight of a hydroxy-terminated polyester resin (B), the sum total of said (A) and (B) being 100% by weight, said polyester resin (B) being grafted on said film-forming polymer (A) by transesterification, and at least part of the acidic groups in said film-forming polymer (A) being neutralized with a base (C), and
           a curing agent, and
           a pigment; and
       at pigment-containing water-based paint composition which comprises
           a polymer thickening agent and
           the pigment-containing water-based paint composition mentioned above;
   (III) applying a paint composition for clear coating thereonto either after or without curing said pigment-containing water-based paint composition applied in the preceding step; and
   (IV) curing said clear coat paint composition thus applied, either alone or simultaneously with said pigment-containing water-based paint composition applied in step (II).

2. The method of coating according to claim 1, wherein said film-forming polymer (A) has a number average molecular weight of 5,000 to 100,000, an acid value of 10 to 100 mgKOH/g and a hydroxyl value of 50 to 200 mgKOH/g.

3. The method of coating according to claim 1, wherein the content of the ethylenic monomer having a saturated hydrocarbon group having 6 to 18 carbon atoms in said film-forming polymer (A) is 30 to 80% by weight.

4. The method of coating according to claim 1, wherein at least part of the acidic groups in said film-forming polymer (A) is neutralized with an amine in mole ratio of an amine per acidic group within the range of 0.4 to 2.0.

5. The method of coating according to claim 1, wherein said hydroxy-terminated polyester resin (B) has a number average molecular weight of 500 to 10,000 and an acid value less than 15 mgKOH/g.

6. The method of coating according to claim 1, wherein the proportion, on the solids basis, of said heat-curable, water-dispersible resin composition to said curing agent is within the range of 100/20 to 100/100.

7. The method of coating according to claim 1, wherein said curing agent is an amino resin.

8. The method of coating according to claim 1, wherein said heat-curable, water dispersible resin composition occurs as particles having a structure such that said polyester resin (B) forms the core and said film-forming polymer (A) forms the shell of each particle.

9. The method of coating according to claim 1, wherein said pigment is a glittering pigment.

10. An article coated by the coating method of claim 1.

* * * * *